United States Patent Office 2,717,267
Patented Sept. 6, 1955

2,717,267
PREPARATION OF HIGH DENSITY CALCIUM PANTOTHENATE

John Joseph Garbarini, Dumont, N. J., assignor to American Cyanamid Company, New York, N. Y., a corporation of Maine No Drawing. Application August 30, 1952,
Serial No. 307,380

4 Claims. (Cl. 260—534)

This invention relates to a process of increasing the apparent bulk density of calcium pantothenate.

Calcium pantothenate is a widely used vitamin salt commonly made by reacting alpha-hydroxy-beta,beta-dimethyl-gamma-butyro lactone with calcium beta-alanate in an organic solvent, usually methanol. The reaction product when dried and ground is a light fluffy powder having an apparent bulk density of only about 0.3. The low density of the material and the nature of the powder makes it extremely difficult to handle in many pharmaceutical operations, such as capsuling. It is desired, therefore, that means of increasing the apparent bulk density of the product be made available. The present invention relates to a process of accomplishing this objective.

When alpha-hydroxy-beta,beta-dimethyl-gamma-butyro lactone is reacted with calcium beta-alanate in methanol at 20° C. or lower, a clear solution of calcium pantothenate is obtained. This solution is seeded with crystals of calcium pantothenate and held until the calcium pantothenate precipitates from solution. The material is centrifuged to remove excess solvent and methanol-soluble impurities after which it is dried, ground, blended and micropulverized to pass through a 100 mesh screen. This material has an apparent bulk density of about 0.3 to 0.35.

Before grinding and micropulverizing, microscopic observation of the dried product reveals the presence of many agglomerates of needle-like crystals which might be likened to sheafs of wheat. After grinding, micropulverizing and screening, the product is essentially a mixture of two types of particles, the larger having a tabular habit and appearing to be agglomerates of unresolved needle-like particles. There is also a very large number of very fine particles having a needle-like habit and showing very wide particle size distribution. The relatively large proportion of the fine needle-like crystals in the pulverized material is apparently the reason for its extremely low bulk density.

I have discovered that it is possible to prepare calcium pantothenate having an apparent bulk density of as high as 0.75 gram per cubic centimeter from the reaction product obtained by reacting the lactone with the calcium beta-alanate, thus making it possible to use the calcium pantothenate with greater facility in pharmaceutical operations. In obtaining an increase in the bulk density of calcium pantothenate, I merely agitate the precipitated reaction product in an operation that can be termed "pasting." The agitating equipment used in this operation is any one of several different types of agitating or grinding equipment such as pony mixer, a sigma mixer, ball mill or other agitating or grinding device that is capable of stirring a thick slurry or paste. This operation is carried out at room temperature over a period of time depending upon the desired bulk density of the final product.

To illustrate the change in density with agitation, calcium pantothenate resulting from the reaction described above was centrifuged and the cake containing 45% by weight of methanol was removed and placed in a pony mixer operating at 50 R. P. M. After a short period of mixing, the cake was reduced to a paste-like consistency. Samples of the product were removed at intervals, dried in an atmospheric oven at 180° F. and then micropulverized to pass through a 100 mesh screen. The results of a series of such tests are shown in the following table:

| Time of Mixing | Apparent Density |
|---|---|
| 10 minutes | 0.55 |
| 20 do | 0.63 |
| 30 do | 0.67 |
| 40 do | 0.68 |

As will be noted above, the apparent bulk density of the material increased from an expected value of about 0.30 to 0.68 after 40 minutes of mixing. The specific rotation of the product remained constant at +25.7° indicating that the calcium pantothenate was stable under the conditions of the operation.

In addition to the choice of different types of mixing equipment, various other modifications can be made in the procedure. For example, small amounts of water may be added to adjust the consistency of the material. Likewise, other solvents such as benzene or ethanol, in which calcium pantothenate is relatively insoluble, may be used for the same purpose. However, since the product is normally precipitated from methanol and as the simplicity of the operation is an important advantage of the process, variations from the procedure described would not ordinarily be undertaken.

The process lends itself to the reworking of dry, fluffy powdered calcium pantothenate of low density. This material may be made into a paste with methanol or some organic liquid in which calcium pantothenate is relatively insoluble and the pasting operation may be conducted until the desired density of the final product is obtained.

The calcium pantothenate resulting from the pasting operation appears, microscopically, to have a different crystal habit. The fine needles are largely eliminated by the pasting operation and, the larger tabular crystals appear to have become rounded. The particle size range has been markedly decreased. The reason for the change of the crystal habit and particle size distribution is not clearly understood. The sheaf-like agglomerates of the fine needles seem to have disappeared and the tiny crystals appear to have been consolidated by some obscure mechanism. The mixture during pasting usually contains a few percent of water and it could be supposed that the very fine crystals are dissolved and reformed during the pasting operation, but this hypothesis has not been verified owing to the difficult nature of the problem. On the other hand, the result may be due to mechanical packing of the needle-like crystals into a denser, blockier form. The hydraulic shearing action due to stirring a thick paste may be cause of the packing of the needles.

To illustrate the invention with greater particularity, two examples will be given of particular batches that were processed by the process described and claimed herein.

Example I

Mixtures of 8 kg. of methanol-wet d-calcium pantothenate (45% methanol by weight) containing from 5% to 80% (by weight) added distilled water were pasted in a pony mixer. The pasting operation was carried out at room temperature for a period of one hour. The resulting mixtures were dried at 70° C. under a vacuum of 30" and micropulverized (through 100 mesh screen) to give products with apparent densities (vacuum-cup method) of about 0.60 gram per cubic centimeter and even as high as 0.72 gram per cubic centimeter.

Example II

Methanol-wet d-calcium pantothenate (45% methanol by weight) in 8 kg. batches was pasted at room temperature in a pony mixer for periods of 30 to 60 minutes. The pasted material was dried either in a vacuum oven under 30" vacuum and at 70° C. for 17 hours or in an atmospheric oven at 80° C. for 12 hours. The dried material after being micropulverized through a 100 mesh screen was found to have an apparent density (vacuum-cup method) varying from 0.67 gram per cubic centimeter to 0.75 gram per cubic centimeter.

I claim:

1. A method of increasing the apparent bulk density of calcium pantothenate to at least 0.5 gram per cubic centimeter which comprises the step of agitating calcium pantothenate crystals in a liquid carrier for at least 8 minutes.

2. A method of producing calcium pantothenate having an apparent bulk density of at least 0.5 gram per cubic centimeter which comprises the steps of pasting calcium pantothenate having an apparent density when dry of less than 0.5 in methanol in a pony mixer, drying the product and pulverizing it.

3. A method of producing calcium pantothenate having an apparent bulk density of at least 0.5 gram per cubic centimeter which comprises the steps of subjecting fine, needle-like crystals of calcium pantothenate and aggregates thereof to a shearing action while suspended in an organic liquid in which the calcium pantothenate is substantially insoluble, removing the organic liquid and recovering calcium pantothenate of increased bulk density.

4. A method of producing calcium pantothenate having an apparent bulk density of at least 0.5 gram per cubic centimeter which comprises the steps of subjecting fine, needle-like crystals of calcium pantothenate and aggregates thereof to a shearing action while suspended in methanol, removing the methanol and recovering calcium pantothenate of increased bulk density.

References Cited in the file of this patent

UNITED STATES PATENTS

| | | |
|---|---|---|
| 2,442,143 | Pickel et al. | May 25, 1948 |
| 2,555,463 | Bogin et al. | June 5, 1951 |